United States Patent [19]

Lazare

[11] Patent Number: 4,475,353

[45] Date of Patent: Oct. 9, 1984

[54] SERIAL ABSORPTION REFRIGERATION PROCESS

[75] Inventor: Leon Lazare, Stamford, Conn.

[73] Assignee: The Puraq Company, Stamford, Conn.

[21] Appl. No.: 388,801

[22] Filed: Jun. 16, 1982

[51] Int. Cl.$^3$ .............................................. F25B 15/00
[52] U.S. Cl. ....................................... 62/101; 62/112; 62/476
[58] Field of Search .................. 62/101, 112, 476, 475

[56] References Cited

U.S. PATENT DOCUMENTS

| | | | |
|---|---|---|---|
| 3,555,841 | 1/1971 | Modahl et al. | 62/476 X |
| 3,817,050 | 6/1974 | Alexander et al. | 62/476 X |
| 4,294,076 | 10/1981 | Yoshii | 62/476 X |
| 4,363,219 | 12/1982 | Koseki et al. | 62/476 X |

Primary Examiner—Lloyd L. King
Attorney, Agent, or Firm—Philip Hill

[57] ABSTRACT

This invention relates to a highly efficient refrigeration system and process, employing two absorption refrigeration cycles in series operation, the first cycle comprising an ammonia-aqueous ammonia system and the second cycle comprising a novel absorption system and process, driven by low-grade heat and operated at pressures substantially below atmospheric, which provides cooling at temperatures as low as about −12° C. to about +15° C. Solutions of normally liquid, mutually soluble compounds, having substantially different boiling points, are employed as refrigerant and absorbent. Typically, the absorbent comprises a distillation bottoms fraction containing from about 65 to about 95 mole % of the higher-boiling compound and the refrigerant comprises a distillation overhead fraction containing from about 93 to about 99 mol. % of the lower-boiling compound. Heat pumped up in the first ammonia cycle is absorbed in the second cycle by refrigerant at the coolant temperature achieved therein.

26 Claims, 2 Drawing Figures

SERIAL ABSORPTION REFRIGERATION PROCESS

BACKGROUND OF THE INVENTION

This invention relates to a highly efficient refrigeration system and process, employing two absorption refrigeration cycles in series operation, the first cycle comprising an ammonia-aqueous ammonia system and the second cycle comprising a novel absorption system and process, driven by low-grade heat and operated at pressures substantially below atmospheric, which provides cooling at temperatures as low as about −10° C. Solutions of normally liquid, mutually soluble components, having substantially different boiling points, are employed as refrigerant and absorbent. Typically, the absorbent comprises a distillation bottoms fraction containing from about 65 to about 95 mol. % of the higher-boiling component and the refrigerant comprises a distillation overhead fraction containing from about 93 to about 99 mol. % of the lower-boiling component. Multi-effect modes may be employed. Heat pumped up in the first ammonia cycle is absorbed in the second cycle by refrigerant at the coolant temperature achieved therein.

The absorption cooling process enables thermal energy to be converted directly into a cooling effect and thus provides the basis for an attractive refrigeration process. In practice the absorption cycle has been employed with only a few absorbent-refrigerant combinations although many components have been suggested based on their respective physical properties and on theoretical consideration of the absorption cycle. In this cycle, refrigerant is first evaporated to afford a cooling effect, refrigerant vapor is then taken up in an absorbent, with evolution of heat, and finally the rich absorbent solution is subjected to fractionation to regenerate the refrigerant as an overhead stream for condensation and recycle to the evaporation step.

The absorption cooling process is usually operated at or near atmospheric pressure. An ideal refrigerant has been defined as one permitting boiling at about 5–10° C. and condensation at about 38° C. or higher. An ideal absorbent should be a liquid having a relatively high boiling point. A suitable refrigerant-absorbent combination should exhibit a significant negative deviation in vapor pressure from an ideal solution. Commercial utilization has been generally limited to two systems, one employing water as refrigerant with lithium bromide brine as absorbent, and the other employing ammonia as refrigerant with aqueous ammonia as the absorbent.

In theory, the efficiency of an absorption cycle is dependent only upon the temperature levels achieved in the evaporator, absorber, generator and condenser sections of the cycle. However, the permissible operating temperatures for these sections exhibit an interdependence which serves to limit the effective performance of the system. For example, the refrigerant partial pressure in the absorber will determine the operating temperature in the evaporator. Similarly, the refrigerant partial pressure in the generator will determine the temperature in the condenser. The operating temperatures in the evaporator and condenser are fixed by the temperatures and concentrations maintained in the absorber and generator.

Existing refrigerant-absorbent systems have been limited either by their physical properties or by the relatively low thermal efficiencies that are realized. For example, the lithium bromide-water system is subject to crystallization of the salt phase if temperatures are set too low; and in the evaporator section, at the lowest temperature in the cycle, icing may occur if this low temperature reaches as low as 0° C. Ammonia-aqueous ammonia systems are often employed despite their generally low coefficients of performance; these systems have greater flexibility in the choice of operating conditions and are not subject to the possibilities of crystallization and icing. In the selection of absorption refrigeration as an alternative to electrically-driven or steam-turbine driven mechanical refrigeration, the choice has generally been limited by economic considerations involving the selective use of a particular form of energy rather than another.

The flexibility and relative lack of corrosivity and related physical problems in the ammonia-aqueous ammonia system make it an attractive focal point for improved production of refrigeration in an economically attractive manner.

Pertinent prior art includes Institute of Gas Technology Research Bulletin No. 14, entitled "The Absorption Cooling Process", which presents a comprehensive review of the literature up to 1957. Refrigerant-absorbent combinations are discussed thoroughly and evaluated in terms of practical and theoretical considerations. Such combinations include: ammonia-aqueous ammonia, water-aqueous lithium bromide, dichloromethane-dimethoxytetraethylene glycol.

In two articles, Hansworth, W. R., "Refrigerants and Absorbents", Part I, *Refrig. Eng.*, 48, 97–100 (1944); Part II, ibid., 48, 201–205 (1944), there is presented an extensive review of the field and which focuses on the system water-diethylene triamine as a promising one for development in light of the properties set forth as desirable in each component. Hainsworth also presents a circular chart, attributed to Taylor, R. S., *Refrig. Eng.*, 17, 135–143, 149 (1929), listing some 66 compounds, from carbon dioxide to glycerol, in order of ascending normal boiling points. This list includes both water and ethylene glycol. In an appendix table of refrigerant-absorbent combinations, ethylene glycol is listed frequently as an absorbent (with, for example, methyl alcohol, ethyl alcohol, n-propyl alcohol, ethylene diamine, n-amyl amine, morpholine, and N-methyl morpholine) and is one of some 27 components proposed as absorbent in combination with water as refrigerant.

In a contemporary publication, Taylor, R. S., "Heat Operated Absorption Units", *Refrig. Eng.*, 49, 188–193, 207 (1945), presents a detailed survey of progress in the design of absorption refrigeration systems. Although water is frequently mentioned as a refrigerant, no mention is made of ethylene glycol.

Among prior patents, U.S. Pat. No. 1,734,278 discloses, as an improvement over the ammonia-water absorption system, the use of a methyl amine as refrigerant and an alcohol, such as glycerine, as the absorbent, particularly when having dissolved therein a metal salt of calcium, barium or lithium. U.S. Pat. No. 1,914,222 discloses ethylene glycol, alone or in mixture with water, as absorbent for use with methylamine as refrigerant. Hydrogen is present as an auxiliary gas. U.S. Pat. No. 1,953,329 discloses means for avoiding the freezing of the refrigerant by mixing with a minor quantity of the absorbent agent in the evaporator zone. U.S. Pat. No. 1,955,345 discusses problems with an ammonia-water system, such as the evaporation of water with ammonia and consequent loss of efficiency.

U.S. Pat. No. 1,961,297 discloses apparatus for use with a water-glycerol mixture at sub-atmospheric pressures. U.S. Pat. No. 2,308,665 discloses water or low-boiling alcohol as refrigerant, and a polyamine or polyamide as absorbent, and cites the methyl amine-ethylene glycol system. U.S. Pat. No. 2,963,875 discloses a heat pump system, employing liquids miscible at elevated temperatures, such as triethyl amine-water. Water and glycols are treated similarly as examples of high-boiling liquids.

U.S. Pat. No. 3,296,814 employs lithium salt solutions as absorbents, typically lithium bromide in ethylene glycol-water. U.S. Pat. No. 3,388,557 claims as an absorbent a solution of lithium iodide in ethylene glycol-water. U.S. Pat. No. 3,524,815 discloses water as refrigerant with an absorbent comprising lithium bromide and iodide, water, and ethylene glycol or glycerine. U.S. Pat. No. 3,643,555 claims specific proportions of the lithium salts.

U.S. Pat. No. 4,127,010 discloses a heat pump apparatus wherein the absorber liquor is preheated during passage to the evaporator by heat exchange with available internal streams to maximize the utilization of available heat. U.S. Pat. No. 4,193,268 discloses an evaporation device which permits a controlled evaporation rate in response to internal pressure differentials. The heat transfer medium may comprise water containing a minor amount of ethylene glycol. Preferred refrigerants include various chlorofluoromethanes and ammonia. Provision is made for injection of evaporator bottoms into a precooler otherwise containing refrigerant being passed to the absorber.

The current economic climate calls for more efficient and more complete use of the available energy resources. There is a genuine need for more efficient absorption refrigeration cycle components. There is a similar need for the economies inherent in a refrigeration system that can utilize waste heat as its driving force.

SUMMARY OF THE INVENTION

This invention relates to a refrigeration system comprising a first cyclic absorption refrigeration system, having as refrigerant substantially anhydrous ammonia, and as absorbent aqueous ammonia, containing from about 30 to about 60 wt. % ammonia and from about 40 to about 70 wt. % water, the improvement comprising the removal of heat therefrom to a second cyclic absorption refrigeration system employed serially with the first ammonia-aqueous ammonia system, whereby heat is withdrawn from the first system at substantially the refrigerant cooling temperature of the second system, said second cyclic absorption refrigeration system employing mutually soluble, normally liquid compounds in each of absorbent and refrigerant components, and comprising:

(a) an evaporation zone, operating at a first, low atmospheric pressure;

(b) an absorption zone, operating at the first low sub-atmospheric pressure; and (c) a fractionation zone, operating at a second, higher sub-atmospheric pressure, having a separation efficiency equivalent to at least about two theoretical plates;

wherein the liquid compounds have normal boiling points differing by at least about 50° C.; the absorbent component comprises from about 65 to about 95 mol. % of the higher-boiling compound; and the refrigerant component comprises from about 93 to about 99 mol. % of the lower-boiling compound.

This invention additionally relates to the inclusion of a multi-stage fractionation zone wherein the successive stages are operated at successively lower pressures intermediate to those described above.

The evaporation and absorption zones may be operated preferably at from about 2 to about 20 mm. mercury absolute pressure, such that the evaporation zone may be maintained desirably at a temperature within the range from about −12° to about +15° C. The reboiler section of the fractionation zone is desirably heated indirectly with a waste heat stream, such as low-pressure effluent steam.

Low-boiling compounds for use in this invention include water, methanol, and acetone. Suitable high-boiling compounds include ethylene glycol, propylene glycols, ethanolamine, diethylene glycol, butyrolactone, and dimethyl formamide.

This invention additionally relates to a refrigeration process employing the system outlined above in serial operation with an ammonia-aqueous ammonia refrigeration process.

DESCRIPTION OF THE DRAWINGS

The attached drawings illustrate, without limitation, operational modes characteristic of the process and system of this invention, including the ammonia-aqueous ammonia process and system.

DETAILED DESCRIPTION OF THE DRAWINGS

Figure 1:
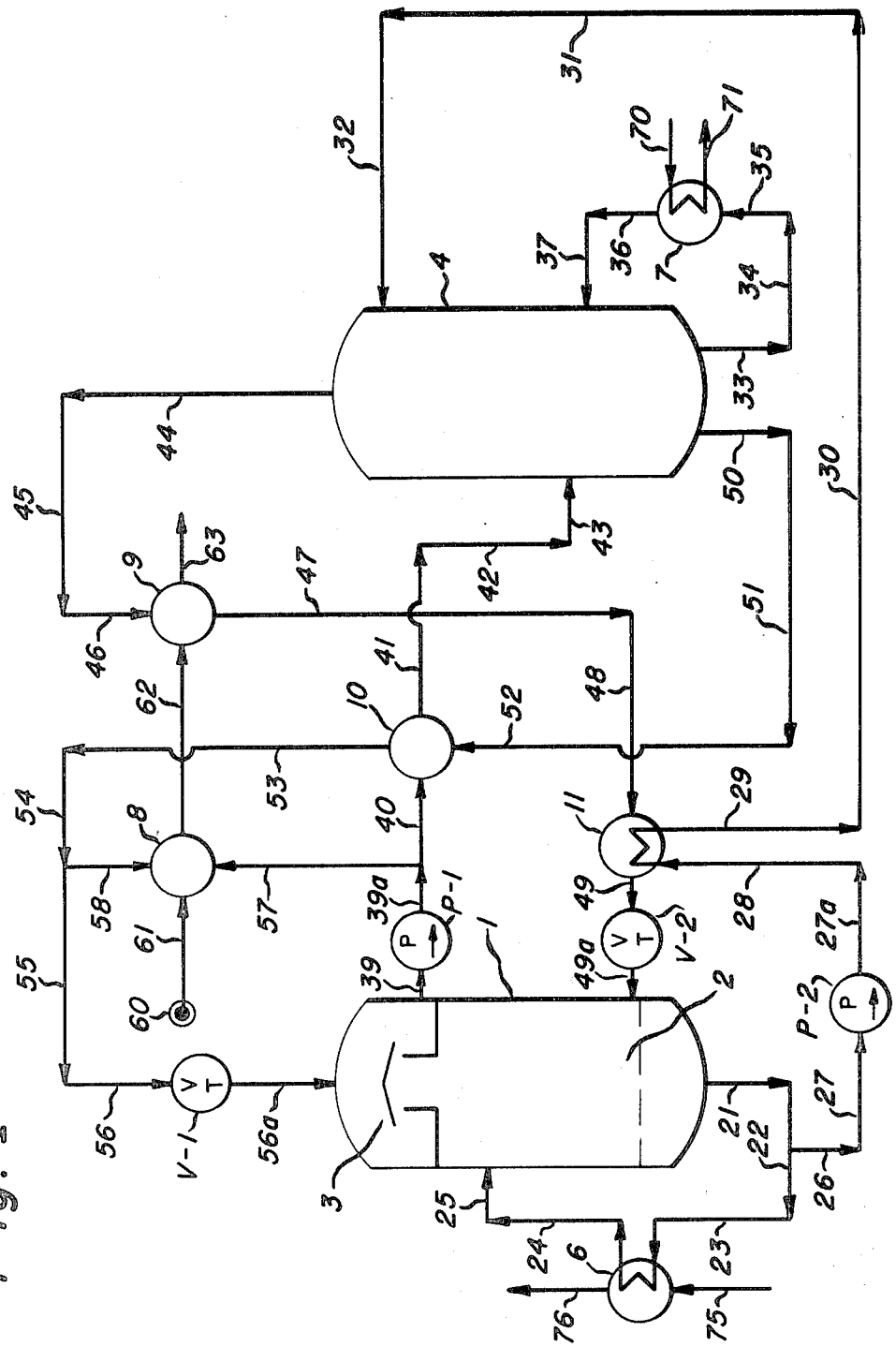
FIG. 1 presents a simplified schematic arrangement of apparatus and piping for use in a version employing one fractionation effect.

FIG. 1 presents schematically a simplified flowsheet illustrating one version of the process or system of this invention. Contained within vessel 1 are evaporation zone 2 and absorption zone 3. The second major vessel 4 comprises the fractionation zone.

Cooled liquid refrigerant component flows from evaporation zone 2 through lines 21, 22, and 23 to heat exchanger 6 where external fluid, passing through lines 75 and 76 is cooled indirectly. Liquid refrigerant component, warmed in this manner by a few degrees is returned through lines 24 and 25 to an upper portion of zone 2 wherein a portion of the stream is flash-vaporized at the equilibrium temperature and pressure of zone 2. The vapors separated in this process are subsequently passed into absorption zone 3 for admixture with absorbent component present therein.

The absorbent component, enriched with refrigerant component in zone 3 is passed through line 39, pump P-1, and line 39a, and recycled in part to zone 3 after passage through line 57, heat exchanger 8, and lines 58, 55, 56, throttle valve V-1, and line 56a. The remaining part is directed through line 40, heat exchanger 10, and lines 41, 42, and 43 to fractionation zone 4. A portion of the fractionator bottoms is reboiled by passage through lines 33, 34, 35, heat exchanger 7, and lines 36 and 37 with reboiling effected indirectly in exchanger 7 with waste steam entering through line 70 and exiting as condensate through line 71. Instead of waste steam, any warm stream may be used, entering through line 70 and leaving through line 71 at a lower temperature. A portion of the refrigerant component is directed through lines 21, 22, 26, 27, pump P-2, lines 27a and 28, heat exchanger 11, and lines 29, 30, 31, and 32 into the upper section of fractionation zone 4 as reflux.

The bottoms from zone 4, comprising absorbent component, is returned to absorption zone 3 by passage successively through lines 50, 51, and 52, heat exchanger 10, and lines 53, 54, 55, 56, valve V-1, and line 56a.

The overhead from zone 4, comprising refrigerant component, is returned to evaporation zone 2 by passage successively through lines 44, 45, and 46, heat exchanger 9, lines 47 and 48, heat exchanger 11, line 49, throttle valve V-2, and line 49a.

Cooling is effected in heat exchangers 8 and 9 by indirect cooling with a water stream from source 60, passing through line 61, exchanger 8, line 62, exchanger 9, and effluent line 63.

If required by the relative positions of the various components of equipment, and by the driving forces needed for the passage of the streams through the equipment and lines, pumps (not shown) may be employed in lines 34 and 51.

Figure 2:
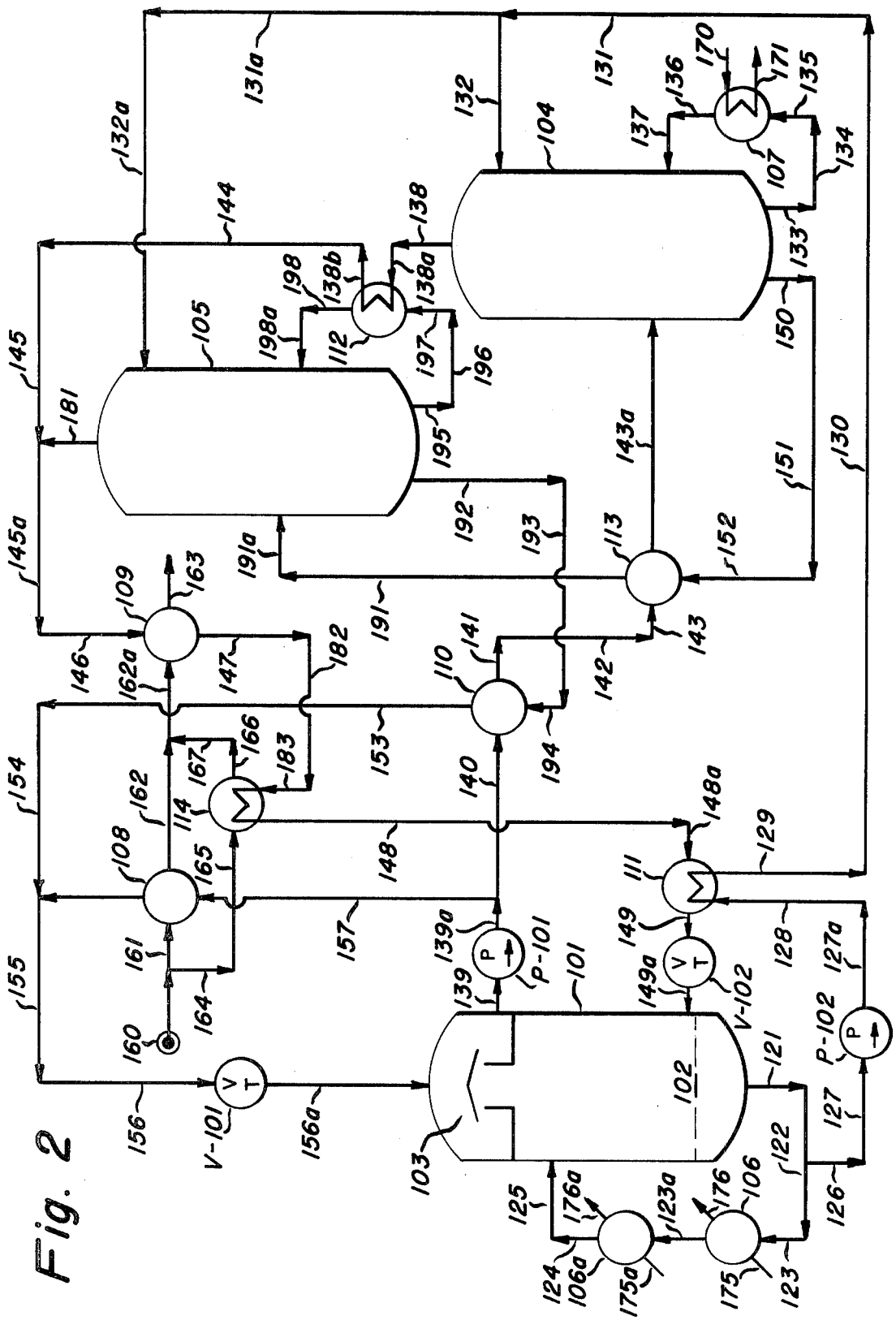
FIG. 2 presents a similar representation employing two fractionation stages.

FIG. 2 presents schematically a simplified flowsheet illustrating a version of the process or system of this invention employing two fractionation effects, or stages. Contained within vessel 101 are evaporation zone 102 and absorption zone 103. Other major vessels include first fractionation effect 104 and second fractionation effect 105.

Cooled liquid refrigerant component flows from evaporation zone 102 through lines 121, 122, and 123 to heat exchanger 106, line 123a and heat exchanger 106a where external fluids, passing through lines 175 and 176, or lines 175a and 176a are cooled indirectly. Refrigerant component additionally passes through lines 124 and 125 for return to an upper portion of zone 102 for admixture with vapors rising within vessel 101 and subsequently being passed into absorption zone 103 for admixture with absorbent component present therein.

The absorbent component, enriched with refrigerant component in zone 103 is passed through line 139, pump P-101, and line 139a, and recycled in part to zone 103 after passage through line 157, heat exchanger 108, and lines 158, 155, 156, throttle valve V-101, and line 156a. The remaining part is directed through line 140, heat exchanger 110, and lines 141, 142, and 143, heat exchanger 113, and line 143a to fractionation zone 104. A portion of the fractionator bottoms from zone 104 is reboiled by passage through lines 133, 134, 135, heat exchanger 107, and lines 136 and 137, with reboiling effected indirectly in exchanger 107 with waste steam entering through line 170 and exiting as condensate through line 171, or alternatively with a warm process stream which exits through line 171 at a lower temperature than in line 170. A portion of the refrigerant component is directed through lines 121, 122, 126, 127, pump P-102, lines 127a and 128, heat exchanger 111, and lines 129, 130, 131, and 132 into the upper section of fractionation zone 104 as reflux.

The bottoms from zone 104 is directed to second fractionation zone 105 by passage successively through lines 150, 151, and 152, heat exchanger 113, and lines 191 and 191a.

A portion of the fractionator bottoms from zone 105 is reboiled by passage through lines 195, 196, 197, heat exchanger 112, and lines 198 and 198a, with reboiling effected indirectly in exchanger 112 with overhead vapors from first fractionator 104 which enter exchanger 112 through lines 138 and 138a and exit through lines 138b, 144 and 145.

The bottoms from zone 105, comprising absorbent component, is returned to absorption zone 103 by passage successively through lines 192, 193, 194, heat exchanger 110, and lines 153, 154, 155, 156, throttle valve V-101, and line 156a.

The overhead vapor stream from zone 105 exits through line 181, merges with the liquid stream from exchanger 112 through line 145, and the combined streams, comprising refrigerant component, are returned to evaporation zone 103 by passage successively through lines 145a, 146, heat exchanger 109, lines 147, 182, 183, heat exchanger 114, lines 148, 148a, heat exchanger 111, line 149, throttle valve V-102, and line 149a.

Cooling is effected in heat exchangers 108 and 109 by indirect cooling with a water stream from water source 160, passing through line 161, exchanger 108, lines 162 and 162a, exchanger 109, and water effluent line 163. A portion of the water stream is diverted through lines 164 and 165, exchanger 114, and lines 166 and 167, finally merging with the main stream in line 162 and continuing through line 162a.

As in FIG. 1, if required by operating conditions and relative positioning of the items of equipment, pumps may be employed in any or all of lines 134, 151, 193 and 196.

DESCRIPTION OF THE INVENTION

This invention relates to a cyclic absorption refrigeration system and to a refrigeration process employing the aforesaid system, in each instance operated serially with an ammonia-aqueous ammonia process or system, driven by low-grade heat and operated at pressures substantially below atmospheric. Cooling to temperatures as low as about $-15°$ C. may be realized while temperatures of about $-5°$ C. are readily achieved. In broad terms, the invention relates to a cyclic absorption refrigeration system, employing mutually soluble, normally liquid compounds in each of absorbent and refrigerant components, comprising:

(a) an evaporation zone, operating at a first, low sub-atmospheric pressure;

(b) an absorption zone, operating at the first low sub-atmospheric pressure; and (c) a fractionation zone, operating at a second, higher sub-atmospheric pressure, having a separation efficiency equivalent to at least about two theoretical plates;

wherein the liquid compounds have normal boiling points differing by at least about 50° C.; the absorbent component comprises from about 65 to about 95 mol. % of the higher-boiling compound; and the refrigerant component comprises from about 93 to about 99 mol. % of the lower-boiling compound.

This invention permits the use of absorption refrigeration as a tool for energy conservation in which waste heat is converted to utilizable refrigeration. Additionally, current striking increases in energy costs make the system and process of this invention particularly attractive for inclusion in the processing of petroleum and manufacture of petrochemicals.

In the system of this inventon, the evaporation and absorption zones are generally maintained at a low sub-atmospheric pressure within the range from about 2 to about 13 mm. mercury absolute pressure, and preferably within the range from about 3 to about 9 mm. mercury absolute pressure. In concert with these zones, the fractionation zone is maintained at a higher subatmospheric pressure, generally within the range from about 30 to about 150 mm. mercury absolute pressure, and preferably within the range from about 30 to about 100 mm. mercury absolute pressure.

With such pressure constraints upon the system, absorbent and refrigerant component compositions may be achieved which permit the maintenance of a temperature in the evaporation zone (flash refrigeration level) within the range from about $-12°$ to about $+15°$ C., and preferably from about $-5°$ to about $+10°$ C. The corresponding temperature in the absorption zone is generally maintained within the range from about 20° to about 60° C., and preferably from about 30° to about 40° C. In order to provide the desired absorbent and refrigerant component compositions, the fractionation zone reboiler section is maintained at a temperature within the range from about 65° to about 110° C., and preferably from about 75° to about 95° C., by indirect heat exchange with an external source of heat.

Inasmuch as high degrees of purity are not essential to the absorbent and refrigerant components in this invention, the fractionation zone need not be highly efficient, a separation efficiency of about three or four theoretical plates being sufficient. Some reflux is provided in the upper section of the fractionator with a purge stream taken from the evaporation zone.

Where desired, an improved degree of effectiveness may be achieved by inclusion of a second fractionation effect. When this is done, the rich absorbent component is directed to a first fractionator operating at a higher pressure, usually within the range from about 250 to about 760 mm. mercury absolute pressure, and preferably from about 300 to about 650 mm. mercury absolute pressure. Bottoms from the first fractionator is fed to a second fractionator operating substantially as described earlier above, except that its reboiler duty is provided by heat exchange with overhead vapors from the first fractionator. As before, the first fractionator derives heat from a reboiler system, now maintained at a temperature generally within the range from about 110° to about 150° C., and preferably from about 120° to about 140° C., by indirect heat exchange with an external source of heat. If desired, still further fractionation effects may be employed although two will usually suffice.

In either the one- or two-effect fractionator arrangements, the temperature level achieved in the evaporation zone permits refrigeration of an external stream, by indirect heat exchange with the chilled liquid refrigerant component, to a temperature preferably within the range from about $-8°$ to about $+20°$ C., and most preferably from about $-3°$ to about $+15°$ C. In practice, such external stream may include ammonia, brines, petrochemical or petroleum process stream, and the like.

A limited number of normally liquid compounds are generally suitable for use in the system and process of this invention. All must be stable, non-corrosive, and completely miscible one with another. For suitable operation of the refrigeration cycle of this invention, the normal boiling points of the lower- and higher-boiling compounds of a selected pair should differ by at least about 50° C. The lower-boiling compound is preferably water, although acetone methanol, or mixtures of any of these may be employed. The higher-boiling compound is preferably ethylene glycol, although such compounds as 1,3-propylene glycol, 1,2-propylene glycol, diethylene glycol, butyrolactone, dimethyl formamide, mono-ethanolamine, or mixtures of any of these may be used. In addition to the water-ethylene glycol system, other promising systems include acetonebutyrolactone, methanol-1,2-propylene glycol, and methanol-1,3-propylene glycol.

The attractive utility of this refrigeration system derives in part from the discovery that neither of the selected absorbent and refrigerant components need comprise substantially pure compounds, thus limiting the fractionation requirements and making possible the selection of compound combinations which in the past have evoked only speculation without the discernment of effective means for efficient and economic utilization. In accordance with this invention, the refrigerant component need only comprise from about 93 to about 99 mole %, preferably about 96 mole %, of the lower-boiling compound. Similarly, the absorbent component need only comprise from about 65 to about 95 mole %, preferably from about 75 to about 90 mole %, of the higher-boiling compound.

In addition to the use of waste heat for reboiling, cooling water at ambient temperature is also employed to remove heat from the overhead vapors from the fractionation zone or from recycled absorbent component (see heat exchangers 9 and 8, respectively, as set forth in FIG. 1).

The thermal efficiency, or coefficient of performance (C.O.P.), of an absorption cycle is defined as the ratio of the cooling effect to the energy input to secure such effect. Stated in different terms, the C.O.P. is the ratio of refrigeration by the evaporator to the heat input to the generator, or fractionator.

In one preferred embodiment of this invention, there is employed the combination of ethylene glycol and water. In the contemplated practice of this embodiment, refrigerant component, containing about 98 mole % water and about 2 mole % ethylene glycol, is flashed at about 3 mm. mercury absolute pressure in the evaporation zone to produce a flash refrigeration level of about $-5°$ C. At this temperature level in the evaporation zone bottoms, an external stream may be cooled by indirect heat exchange to a temperarure of about $-3°$ C. Possible freezing of the water in the bottoms is conveniently avoided by the presence of ethylene glycol. The flashed vapor, principally water, is passed to the absorption zone and absorbed in the absorbent component, containing about 15 mole % water and about 85 mole % ethylene glycol, at the same pressure. The temperature of the water-enriched absorbent component is about 35° C. One portion of the enriched absorbent component is recycled to the absorption zone after rejecting the heat of absorption to cooling water at about 32° C.

The major portion of the water-enriched absorbent component is re-concentrated in a fractionation zone, comprising one theoretical stripping plate and two theoretical rectifying plates, at a pressure of about 52 mm. mercury and a reboiler temperature of about 81° C., with the refrigerant component, comprising about 98 mole % water and about 2 mole % ethylene glycol, being recovered as the overhead product and returned to the evaporation zone. Reflux to the fractionation zone is provided by directing a slipstream from the evaporation zone bottoms to tne upper portion of the fractionator. The heat of condensation of the overhead product is rejected to cooling water at about 34° C. Heat to the reboiler is provided by heat exchange with low-pressure steam available at about 110° C. The fractionator bottoms, or absorbent component, comprising about 85 mole % ethylene glycol and about 15 mole % water, is returned to the absorption zone after heat exchange with the water-rich effluent from the absorption zone.

In a second preferred embodiment there is added a second fractionation stage or effect with one stage operating at the conditions set forth above. In this embodiment the added fractionator is operated at the higher pressure of about 440 mm. mercury and the overhead vapors are cooled by reboiling the first fractionator. Bottoms from the second fractionator are at a temperature of about 131° C. Reboiler duty is provided by a higher quality waste steam available at about 135° C. Overhead vapors from the two fractionation zones are combined for return to the evaporation zone.

In this second preferred embodiment only one of the fractionators is reboiled with an external heat source, such as low-pressure steam, so that the quantity of regeneration heat is reduced by at least about 40%.

Process calculations, for operations conducted substantially as described above, show extremely high coefficients of performance, as set forrh below:

|  | Single-effect | Two-effect |
|---|---|---|
| Refrigeration Load, BTU/Hr. | 1,000,000 | 1,000,000 |
| Refrigeration temp., °C. | −4 | −4 |
| Cooling water temp., °C. | 32 | 32 |
| Regeneration temp., °C. | 81 | 131 |
| Coefficient of Performance, C.O.P. | 0.85 | 1.47 |

A widely used absorption cooling cycle consists of ammonia as refrigerant and aqueous ammonia as absorbent, sometimes with hydrogen gas present as a third phase. For effective use, as in industrial air conditioning, water must be removed from the refrigerant component recovered as overhead vapor from the generator, or fractionator, zone. In a typical ammonia cycle, ammonia is boiled from a solution at about 140° C. and about 175 p.s.i.a. The ammonia is condensed at about 35° C. and transferred to an evaporation zone after throttling to about 760 mm. mercury pressure absolute. The flash evaporation level achieved under these conditions is about −33° C. After absorption of vapor, the absorbent solution, now at about 35° C., is pumped back to the fractionator and recycled. Heat is removed from both the fractionation zone condenser and from the absorption zone effluent by indirect heat exchange with cooling water. In typical units the coefficient of performance (C.O.P.) is within the range from about 0.1 to about 0.3.

The hybrid process of this invention effectively combines the novel process, described above in detail, with the ammonia-aqueous ammonia process by employing the cooled refrigerant component of the novel process to withdraw heat from the ammonia process fractionator zone overhead and absorbent zone effluent. This effectively removes the refrigerant component (ammonia) heat of condensation and its heat of solution in the absorbent component (aqueous ammonia). With reference to FIG. 1, as applied, for example, to a process employing ammonia-aqueous ammonia, the coolant supplied at cooling source 60 is the refrigeration zone bottoms from, for example, an ethylene glycol-water process, rather than a cooling water stream. In this manner the coolant temperature can be lowered, for example, from about 35° C. to about 5° C.

This drop in heat-exchange temperatures permits lower fractionation zone, or generator, temperatures and pressures. This, in turn, tends to limit the needed reboiler duty. When coupled with the improved refrigeration duty, as well as quality of refrigeration, greatly increased coefficients of performance are realized.

Process calculations, for withdrawing heat from an ammonia-water system by the hybrid process of this invention, show marked improvement in the coefficients of performance relative to those realized in the conventional ammonia-aqueous ammonia process. This is shown in examples A and B for two low refrigeration levels.

|  | A | B |
|---|---|---|
| Refrigeration Load, BTU/hr. | 1,000,000 | 1,000,000 |
| Refrigeration temp., °C. | −18 | −33 |
| Coolant temp., °C. | 3 | 3 |
| Regeneration temp., °C. | 35 | 55 |
| Coefficient of Performance, C.O.P. | 0.79 | 0.67 |

The discussion and examples of the practice of this invention have dwelt on the use of low-pressure, waste steam as a source of external heat, and on cooled refrigerant component for removal of heats of absorption and condensation, and it should be emphasized that any sources of low-value heating may be employed. This invention makes effective the use of otherwise waste energy in a tandem operation to provide highly desirable and utilizable levels of refrigeration.

The refrigeration system of this invention may also be employed serially with any suitable mechanical refrigeration system to afford an economically and technically attractive means for achieving unusually low temperatures.

What is claimed is:

1. A cyclic absorption refrigeration process, employing, in a first absorption refrigeration cycle, in a refrigerant component and in an absorbent component, mutually soluble, normally liquid compounds, whose normal boiling points differ by at least about 50° C., and in a second absorption refregeration cycle, substantially anhydrous ammonia as refrigerant component and aqueous ammonia, containing from about 40 to about 70 wt. % water, as absorbent component, comprising the steps of:

(a) rectifying a refrigerant-enriched absorbent component, in a first-cycle fractionation zone, to provide an overhead refrigerant component stream, comprising from about 93 to about 99 mole % of the lower-boiling compound and from about 1 to about 7 mole % of the higher-boiling compound, and a bottoms absorbent component stream, comprising from about 65 to about 95 mole % of the higher-boiling compound and from about 5 to about 35 mole % of the lower-boiling compound, at a reflux zone pressure within the range from about 30 to about 150 mm. mercury absolute pressure, and at a reboiler zone temperature within the range from about 65 to about 110° C., the reboiler zone being supplied, by indirect heat exchange, with heat from an external source of low-grade heat;

(b) cooling the overhead refrigerant component stream by indirect heat exchange with an external coolant stream;

(c) transferring the cooled overhead refrigerant component stream to a first-cycle evaporation zone;

(d) cooling the bottoms absorbent component stream by indirect heat exchange with the refrigerant-enriched absorbent component stream;

(e) transferring the cooled bottoms absorbent component stream to a first-cycle absorption zone.

(f) evaporating a substantial portion of the refrigerant component in the first-cycle evaporation zone maintained at a pressure within the range from about 2 to about 13 mm. mercury absolute pressure, to achieve a temperature in a remaining portion of the refrigerant component within the range from about $-12°$ to about $+15°$ C.;

(g) collecting an ammonia-water effluent mixture as enriched absorbent component from a second-cycle absorption zone;

(h) rectifying the ammonia-water mixture in a second-cycle fractionation zone to provide an overhead refrigerant component stream, comprising substantially anhydrous ammonia, and a bottoms absorbent component stream, comprising aqueous ammonia;

(i) circulating the remaining portion of the refrigerant component to a first-cycle refrigeration zone where, by indirect heat exchange, second-cycle ammonia overhead and ammonia-water effluent mixture are cooled to a temperature within the range from about $-8°$ to about $+20°$ C.

(j) conducting the evaporated portion of the refrigerant component to the first-cycle absorption zone for mixing therein with the absorbent component to provide the refrigerant-enriched absorbent component, said absorption zone being maintained at the same pressure as the evaporation zone and at a temperature within the range from about 20° to about 60° C., by continuously cooling a portion of the refrigerant-enriched absorbent component in indirect heat exchange with the external coolant stream;

(k) returning the refrigerant-enriched absorbent component to the first-cycle fractionating zone;

(l) continuously withdrawing a minor part of the refrigerant component from the first-cycle evaporation zone and injecting said refrigerant component into the first-cycle reflux zone;

(m) evaporating a substantial portion of the anhydrous ammonia in the second-cycle evaporation zone to achieve a temperature in the remaining liquid ammonia within the range from about $-15°$ to about $-60°$ C.; and (n) circulating the remaining liquid ammonia to a second-cycle refrigeration zone where, by indirect heat exchange, an external heat exchange fluid is cooled to a temperature within the range from about $-10°$ to about $-55°$ C.

2. The process of claim 1 wherein the lower-boiling compound is selected from the class consisting of water, methanol, acetone, and mixtures thereof.

3. The process of claim 1 wherein the higher-boiling compound is selected from the class consisting of ethylene glycol; diethylene glycol; 1,3-propylene glycol; 1,2-propylene glycol; butyrolactone; dimethyl formamide; monoethanolamine; and mixtures thereof.

4. The process of claim 1 wherein the lower-boiling compound is water and the higher-boiling compound is ethylene glycol.

5. The process of claim 1 wherein the lower-boiling compound is acetone and the higher-boiling compound is butyrolactone.

6. The process of claim 1 wherein the lower-boiling compound is methanol and the higher-boiling compound is 1,2-propylene glycol or 1,3-propylene glycol.

7. The process of claim 1 wherein the first-cycle fractionation zone comprises a plurality of stages, the added stages operating at successively higher reboiler temperatures; the reboiler duty of the highest-pressure stage being provided by an external source of low-grade heat; said highest-pressure stage processing the refrigerant-enriched absorbent component from the first-cycle absorption zone; each successive lower-pressure stage processing the bottoms stream from the next-higher-pressure stage; the reboiler duty to each successive lower-pressure stage being afforded by the overhead refrigerant component stream from the preceding stage; the overhead streams from each stage being collected for transfer to the first-cycle evaporation zone; and the bottoms stream from the lowest-pressure stage being transferred to the first-cycle absorption zone.

8. A serial absorption refrigeration process comprising the steps of:

(a) fractionating in a first absorption refrigeration cycle a water-ethylene glycol mixture, to provide a first-cycle overhead refrigerant component, comprising about 98 mole % water and about 2 mol. % ethylene glycol, and a first-cycle bottoms absorbent component, comprising about 85 mol. % ethylene glycol and about 15 mol. % water, at a reflux pressure of about 50 mm. mercury absolute and a reboiler temperature of about 85° C., in indirect heat exchange with an external source of low grade steam;

(b) fractionating in a second absorption refrigeration cycle a water-ammonia mixture, to provide a second-cycle overhead refrigerant component, comprising substantially anhydrous ammonia, and a second-cycle bottoms absorbent component, comprising about 38 mole % ammonia and about 62 mole % water, at a reflux pressure of about 75 p.s.i.a. and a reboiler temperature of about 60° C.;

(c) cooling the first-cycle overhead refrigerant component with an external cooling water source and transferring the cooled component to a first-cycle evaporation zone;

(d) transferring the first-cycle bottoms absorbent component to a first-cycle absorption zone;

(e) evaporating a substantial portion of the refrigerant component in the first-cycle evaporation zone, at a pressure of about 5 mm. mercury absolute to provide a temperature level in the residual portion thereof of about 5° C.;

(f) absorbing the evaporated portion of the refrigerant component in the absorbent component in the first-cycle absorption zone, at a pressure of about 5 mm. mercury absolute and at a temperature maintained at about 35° C. by indirect heat exchange of the enriched absorbent component with an external cooling water source;

(g) returning the water-ethylene glycol product of the absorption step (f) to the fractionating step (a);

(h) cooling the second-cycle ammonia overhead refrigerant to a temperature of about 5° C. in indirect heat exchange with the residual refrigerant component from step (e);

(i) transferring the second-cycle water-ammonia bottoms absorbent component to a second-cycle absorption zone;

(j) evaporating a substantial portion of the ammonia in the second-cycle evaporation zone, at a pressure of about 760 mm. mercury absolute to provide a second-cycle refrigeration temperature in the residual portion thereof of about −33° C.;

(k) absorbing the evaporated ammonia in the second-cycle absorbent component in the second-cycle absorption zone at a pressure of about 760 mm. mercury absolute and at a temperature maintained at about 5° C. by indirect heat exchange of the enriched absorbent component with the residual refrigerant component from step (e);

(l) returning the ammonia-water product of the absorption step (k) to the fractionating step (b); and (m) withdrawing a portion of the residual refrigerant component from the first-cycle evaporation zone and injecting said portion as reflux into the first-cycle fractionating step (a).

9. The process of claim 8 wherein there is provided a second-cycle refrigeration temperature within the range from about −15° to about −40° C.

10. In a refrigeration system, comprising a first cyclic absorption refrigeration system, having as refrigerant substantially anhydrous ammonia, and as absorbent aqueous ammonia, containing from about 30 to about 60 wt. % ammonia and from about 40 to about 70 wt. % water, the improvement comprising the removal of heat therefrom to a second cyclic absorption refrigeration system employed serially with the first ammonia-aqueous ammonia system, whereby heat is withdrawn from the first system at substantially the refrigerant cooling temperature of the second system, said second cyclic absorption refrigeration system employing mutually soluble, normally liquid compounds in each of absorbent and refrigerant components, and comprising:

(a) an evaporation zone, operating at a first, low atmospheric pressure;

(b) an absorption zone, operating at the first low sub-atmospheric pressure; and (c) a fractionation zone, operating at a second, higher sub-atmospheric pressure, having a separation efficiency equivalent to at least about two theoretical plates;

wherein the liquid compounds have normal boiling points differing by at least about 50° C.; the absorbent component comprises from about 65 to about 95 mol. % of the higher-boiling compound; and the refrigerant component comprises from about 93 to about 99 mol. % of the lower-boiling compound.

11. The refrigeration system of claim 10 wherein a purge stream from the evaporation zone is continuously introduced into a reflux section of the fractionation zone.

12. The refrigeration system of claim 10 wherein the first, low sub-atmospheric pressure is maintained within the range from about 2 to about 13 mm. mercury absolute pressure.

13. The refrigeration system of claim 10 wherein the second, higher sub-atmospheric pressure is maintained within the range from about 30 to about 150 mm. mercury absolute pressure.

14. The refrigeration system of claim 10 wherein the evaporation zone is maintained at a temperature within the range from about −12° to about +15° C.

15. The refrigeration system of claim 10 wherein the absorption zone is maintained at a temperature within the range from about 20° to about 60° C.

16. The refrigeration system of claim 10 wherein the fractionation zone includes a reboiler section, maintained at a temperature within the range from about 65° to about 110° C.

17. The refrigeration system of claim 14 wherein an external refrigeration fluid is continuously cooled, by indirect heat exchange with the refrigerant component from the evaporation zone, to a temperature within the range from about −8° to about +20° C.

18. The refrigeration system of claim 16 wherein the reboiler section of the fractionation zone is continuously warmed by indirect exchange with an external source of heat.

19. The refrigeration system of claim 10 wherein the higher-boiling compound is selected from the class consisting of ethylene glycol; diethylene glycol; 1,3-propylene glycol; 1,2-propylene glycol; butyrolactone; dimethyl formamide; monoethanolamine; and mixtures thereof.

20. The refrigeration system of claim 10 wherein the lower-boiling compound is selected from the class consisting of water; methanol; acetone; and mixtures thereof.

21. The refrigeration system of claim 19 wherein the higher-boiling compound is ethylene glycol.

22. The refrigeration system of claim 20 wherein the lower-boiling compound is water.

23. The refrigeration system of claim 10 wherein the higher-boiling compound is ethylene glycol and the lower-boiling compound is water.

24. The refrigeration system of claim 10 wherein the fractionation zone comprises, in serial arrangement, a first fractionator, operating at a third, highest sub-atmospheric pressure, and a second fractionator, operating at the second, higher sub-atmospheric pressure, an overhead stream from the first fractionator providing, by indirect heat exchange, the reboiler heat duty required for operation of the second fractionator.

25. The refrigeration system of claim 24 wherein the third, highest sub-atmospheric pressure is maintained within the range from about 250 to about 760 mm. mercury absolute pressure.

26. The refrigeration system of claim 24 wherein the first fractionator includes a reboiler section, maintained at a temperture within the range from about 110° to about 150° C. by indirect heat exchange with an external source of heat.

* * * * *